United States Patent [19]
Satake et al.

[11] Patent Number: 6,078,759
[45] Date of Patent: Jun. 20, 2000

[54] IMAGE FORMING SYSTEM INCLUDING MEANS FOR INHIBITING OR RELEASING ONE OF A PLURALITY OF IMAGE FORMING APPARATUSES

[75] Inventors: Takeshi Satake, Sakai; Naoki Ohashi; Naoyoshi Kinoshita, both of Aichi-Ken; Yoshikazu Watanabe, Toyohashi, all of Japan

[73] Assignee: Minolta Co., Ltd., Osaka, Japan

[21] Appl. No.: 09/124,082

[22] Filed: Jul. 29, 1998

[30] Foreign Application Priority Data

Aug. 11, 1997 [JP] Japan ..................................... 9-216256

[51] Int. Cl.⁷ .............................. H04N 1/00; G03G 15/00
[52] U.S. Cl. .............................. 399/8; 358/1.15; 358/401; 399/82
[58] Field of Search ................................. 399/8, 9, 11, 81, 399/82, 85, 87; 395/114, 113; 358/296, 401, 1.14, 1.15

[56] References Cited

U.S. PATENT DOCUMENTS

| | | | |
|---|---|---|---|
| 5,245,368 | 9/1993 | Farrell et al. ........................... | 358/401 |
| 5,689,755 | 11/1997 | Ataka ........................................... | 399/8 |
| 5,692,229 | 11/1997 | Ishimoto et al. ..................... | 358/401 X |
| 5,809,363 | 9/1998 | Kitamura et al. ............................ | 399/8 |
| 5,812,747 | 9/1998 | Kayano et al. ......................... | 358/1.15 |

FOREIGN PATENT DOCUMENTS

| | | |
|---|---|---|
| 7-095334 | 4/1995 | Japan . |
| 7-123218 | 5/1995 | Japan . |
| 7-123224 | 5/1995 | Japan . |

*Primary Examiner*—Sophia S. Chen
*Attorney, Agent, or Firm*—Burns, Doane, Swecker & Mathis, LLP

[57] ABSTRACT

An image forming apparatus includes a communications line for connecting the image forming apparatus to other image forming apparatuses to create a system of a plurality of image forming apparatuses; a device for setting a connected printing mode to allocate and print jobs to be printed by the plurality of image forming apparatuses; a device for executing printing in the connected printing mode by the plurality of image forming apparatuses; and a device for releasing the use of the image forming apparatus under the connected printing mode when the image forming apparatus receives a print command while a printing operation is being executed by the plurality of image forming apparatuses under the connected printing mode.

16 Claims, 8 Drawing Sheets

IMAGE FORMING SYSTEM INCLUDING MEANS FOR INHIBITING OR RELEASING ONE OF A PLURALITY OF IMAGE FORMING APPARATUSES

BACKGROUND OF THE INVENTION

1. Field of the Invention

The present invention relates to an image forming system connecting a plurality of image forming apparatuses such as copiers, facsimiles, printers and the like, via communications lines.

2. Description of Related Art

Heretofore, an image forming system has been known, for example, to connect a plurality of copiers provided with external communications functions and image memory, via communications lines, and allocate parts of a print job to a plurality of said copiers to accomplish copying as if by a single copier, so as to increase the copying speed and printing output capacity. See Japanese Laid-Open Patent Publication Nos. 07-123224; 07-123218; and 07-95334.

In the aforesaid conventional image forming system, using two connected copiers as an example, when the connected printing mode is set and a first copier allocates part of a print job to a second copier so as to execute said print job together, another user attempting to operate said second copier to print a rush job will be unable to print the rush job with said second copier until the currently executing print job has completely finished because said second copier is printing the job allocated under the connected printing mode. Furthermore, when a first user has set the connected printing mode in a first copier and a second user attempts to operate a second copier to print a rush job, the rush job cannot be printed by said second copier until the print job allocated under the connected printing mode has been completely finished because said second copier cannot be used immediately due to the usage priority set by the connected printing mode.

Therefore, the start of the print job of the second user is disadvantageously delayed, which has a markedly adverse affect on operation characteristics particularly when large jobs are allocated under the connected printing mode.

OBJECTS AND SUMMARY

An object of the present invention is to provide an image forming system which allows a second user to input second print commands to a second image forming apparatus when a first user has set the connected printing mode in a first image forming apparatus, such that when a first print command is input to said first image forming apparatus currently executing a job under the connected printing mode, the image forming apparatus to which said second print command is input can be immediately operated independently from the other image forming apparatus in addition to the operation under the connected printing mode, thereby providing excellent operation characteristics and greater efficiency.

According to an embodiment of the present invention, an inhibiting means inhibits the use of a second image forming apparatus under the connected printing mode when said second image forming apparatus has received a second print command simultaneously with the setting or during the setting of a connected printing mode in a first image forming apparatus to use said second image forming apparatus in joint printing.

Accordingly, the connected printing mode set by the aforesaid first image forming apparatus does not have priority, and the user entering the second print command to the aforesaid second image forming apparatus can immediately execute the desired rush print job without waiting for the completion of printing under the connected printing mode as in the conventional systems, thereby providing excellent operation characteristics and greater efficiency.

According to another embodiment of the present invention, a release means releases the use of a specific image forming apparatus under the connected printing mode when said specific image forming apparatus receives a print command while a printing operation is being executed by a plurality of image forming apparatuses under the connected printing mode.

Accordingly, in the aforesaid image forming system, a user entering a print command in the aforesaid specific image forming apparatus can immediately print his own rush job using said specific image forming apparatus without waiting for the completion of the single print job being printing by said plurality of image forming apparatuses under the connected printing mode, thereby providing excellent operation characteristics and greater efficiency.

DETAILED DESCRIPTION OF THE PREFERRED EMBODIMENTS

First Embodiment

The present invention is described hereinafter by way of the preferred embodiments.

Figure 1:
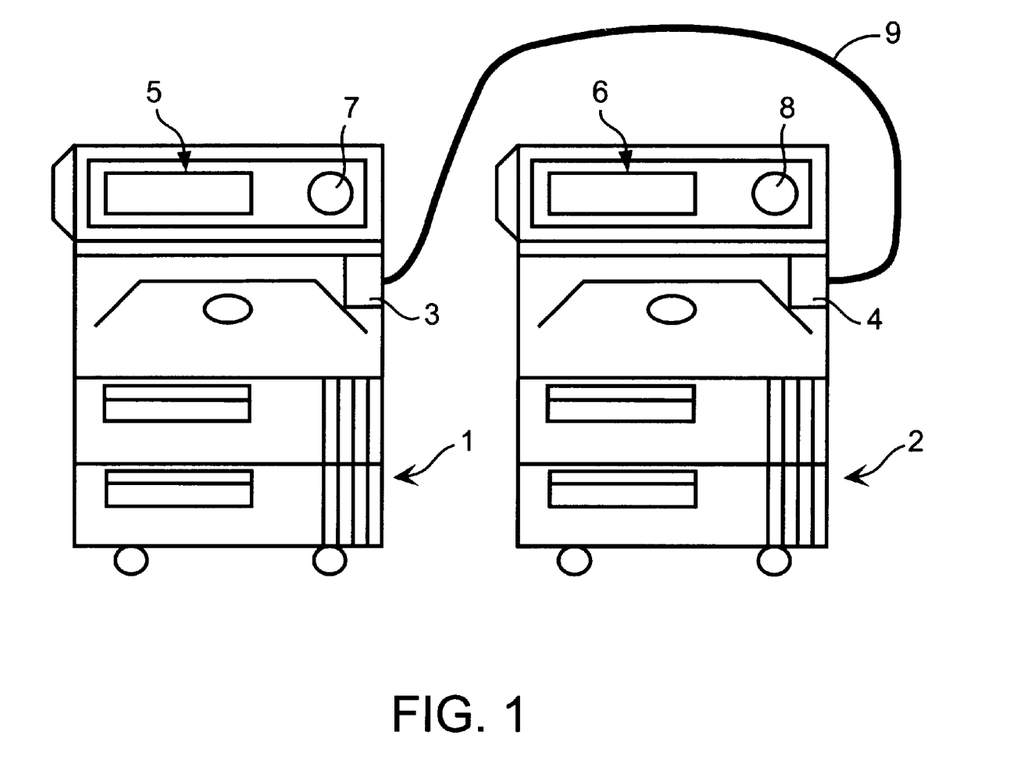
FIG. 1 shows an example of the construction of the image forming system of the present invention.

FIG. 1 shows an example of the construction of the image forming system of the present invention, wherein the image forming system comprises two copiers 1 and 2 as a plurality of image forming apparatuses having communications functions and which are mutually connected via a communications line 9 so as to be capable of mutually sending and receiving data between said two image forming apparatuses.

Copier 1 is provided with a controller 3 for respectively controlling both itself and copier 2 that is connected to copier 1 via communications line 9, and an operation panel 5 for entering various operator input and displaying various conditions of copier 1. Copier 2 is similarly provided with an identical controller 4 and operation panel 6. Operation panels 5 and 6 are provided with, for example, print start buttons 7 and 8, respectively.

The controller 3 of copier 1 sets the connected printing mode and executes printing in said mode. That is, copier 1 is linked to the copier 2 connected to copier 1, so as to allocate parts of jobs to copier 2 and jointly print said jobs.

Among the two connected copiers 1 and 2, when the print start button 8 on operation panel 6 of copier 2 is pressed after the print start button 7 of copier 1 has already been pressed, controller 3 inhibits the use of the second copier under the connected printing mode, i.e., the second copier 2 is separated from copier 1 under the connected printing mode, so as to allow the second copier 2 to execute printing independently.

Similarly, controller 4 also executes printing via operation panel 6 under the connected printing mode when said mode is set. Among the two connected copiers 1 and 2, controller 4 also separates copier 1 from copier 2 under the connected printing mode when the print start button 7 on operation panel 5 is pressed after the start button 8 has been pressed on copier 2, so as to allow copier 1 to execute printing independently.

When both copiers 1 and 2 are set in the connected printing mode, and operation buttons, e.g., the print start buttons 7 and 8, are simultaneously operated on operation panels 5 and 6 of copiers 1 and 2 by different operators to start a copy operation, the controllers 3 and 4 of copiers 1 and 2 shown in FIG. 1 separate the connected operation to operate the respective copiers 1 and 2 independently to receive input operations from either operator, thereby providing excellent operation characteristics and greater efficiency.

Figure 2:
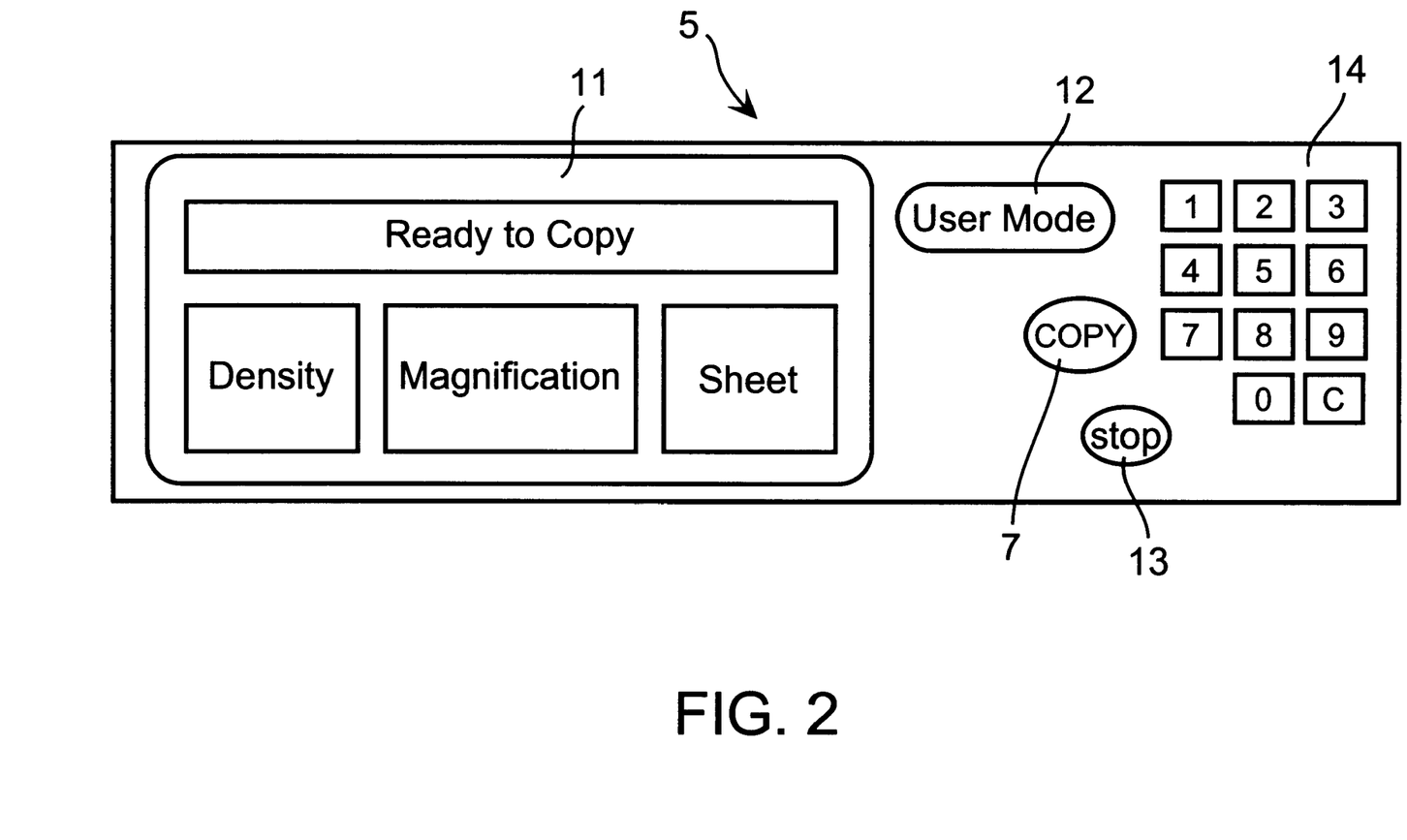
FIG. 2 shows the operation panel of the copier of FIG. 1.

FIG. 2 shows operation panel 5 of copier 1. Operation panel 5 comprises a liquid crystal touch panel 11 for entering various settings, user mode button 12 for entering modes suitable for the usage environment previously set by a user to avoid complex mode setting, print start button 7 which is pressed to start printing, print stop button 13 which is pressed to stop printing, and ten-key pad 14 for entering the number of printouts.

Normal printing is accomplished by entering a desired printout number via ten-key pad 14 and pressing the print start button 7, and may be terminated if desired by pressing the print stop button 13. When it is desirable to change the paper size, magnification, or density, the appropriate button on liquid crystal touch panel 11 is pressed. Setting the aforesaid connected printing mode and separate printing mode is accomplished using the user mode button 12. The operation panel 6 of copier 2 is identical in construction.

FIG. 3 shows the sequence for setting the connected printing mode in conjunction with the change in display of the operation panel.

Figure 3A:
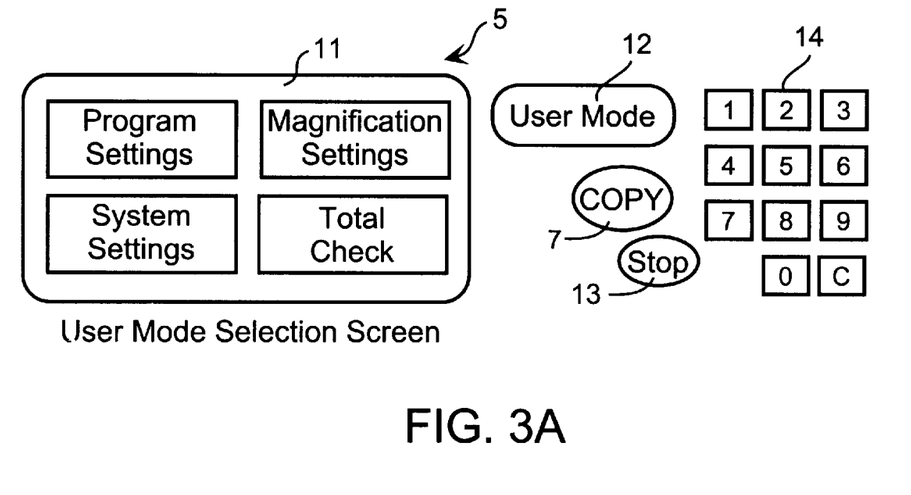
FIG. 3 shows the sequence of setting the connected printing mode in conjunction with the changing display of the operation panel of FIG. 2.

First, when the user mode button 12 is pressed on operation panel 5, the user mode selection screen shown in FIG. 3(A) is displayed on liquid crystal touch panel 11, and since the connected printing mode is included in "System Settings", this button is pressed.

Figure 3B:
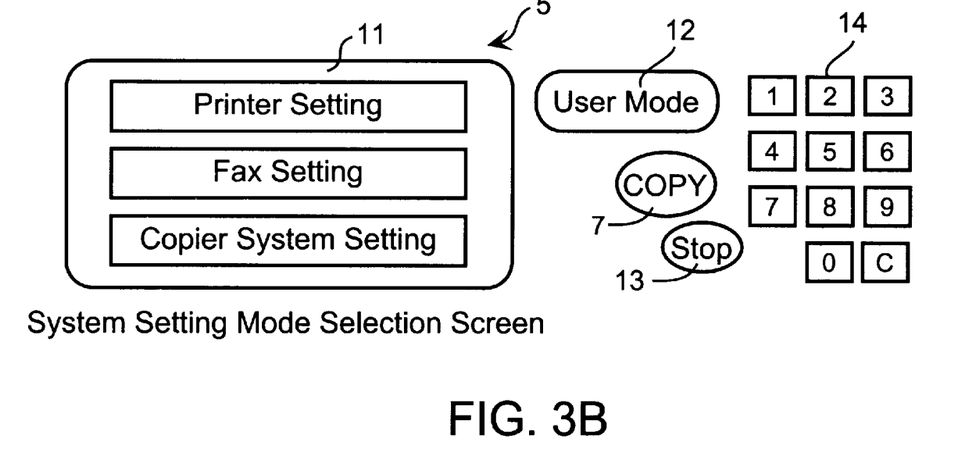

Then, the system setting mode selection screen shown in FIG. 3(B) is displayed on liquid crystal touch panel 11, and since the connected printing mode is "Copier System Setting", this button is pressed.

Figure 3C:
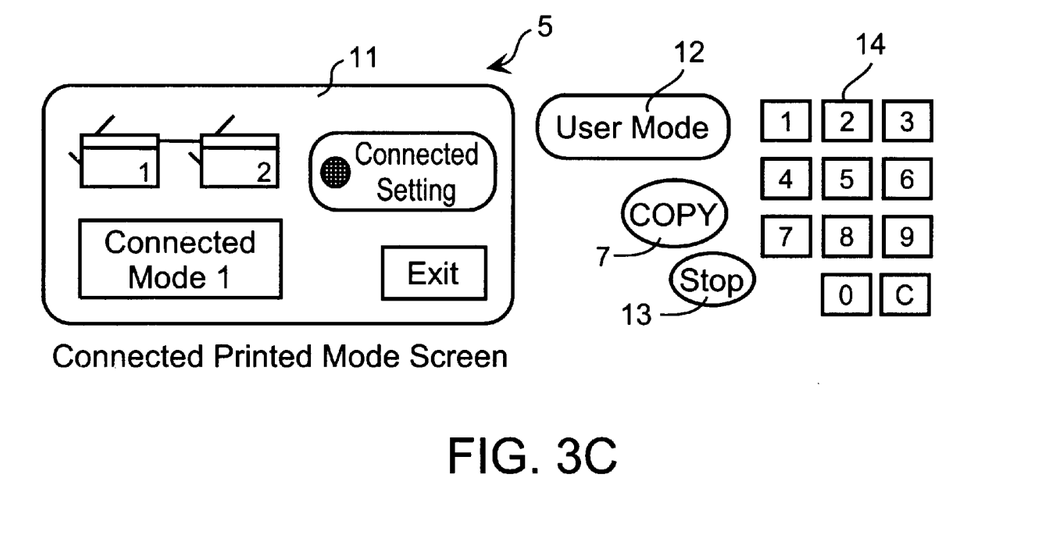
Figure 3D:
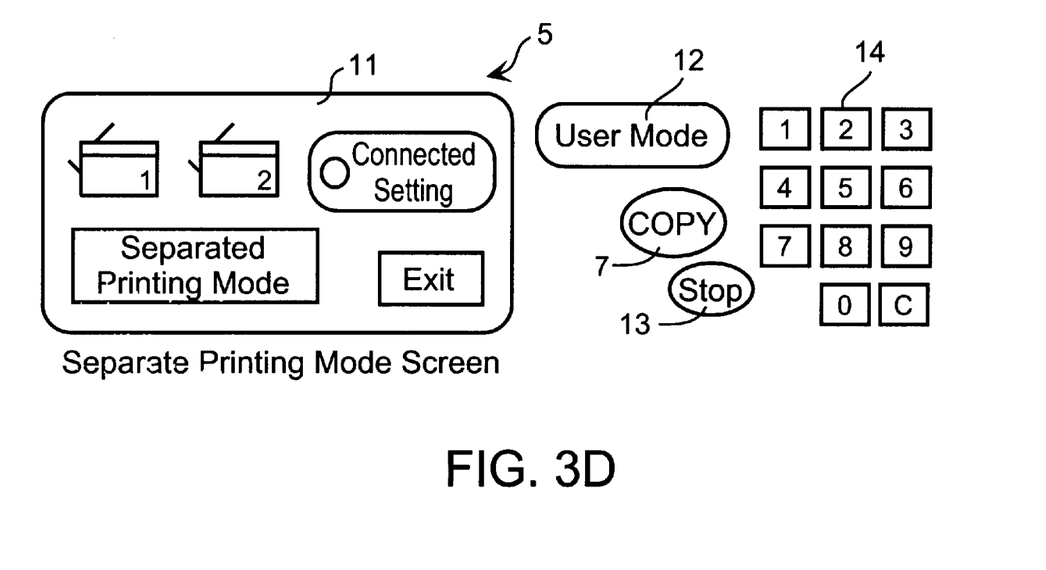

Then, the screen shown in FIG. 3(C) is displayed on liquid crystal touch screen 11. When the "Connected setting" button is pressed on this screen, the separate printing mode display of FIG. 3(D) appears. On the other hand, when the "Connected Setting" button is pressed in the state shown in FIG. 3(D), the connected printing mode of FIG. 3(C) is set. The aforesaid connected printing mode comprises a "Connected Mode 1" which separates the copier from the connection and executes independent printing by each copier even when both copiers 1 and 2 are executing a print job under the connected printing mode, and "Connected Mode 2" which does not allow separation of the individual copiers when both copiers 1 and 2 are executing a print job under the connected printing mode. The selection of each mode is switchable by pressing the appropriate button (e.g., "Connected Mode 1" button of FIG. 3(C)), on the liquid crystal touch panel.

When the setting operation is completed, the "Exit" button is pressed on liquid crystal touch panel 11, and the display returns to the normal display shown in FIG. 2. The connected printing mode described here is found in the setting state shown in FIG. 3(C).

Figure 4:
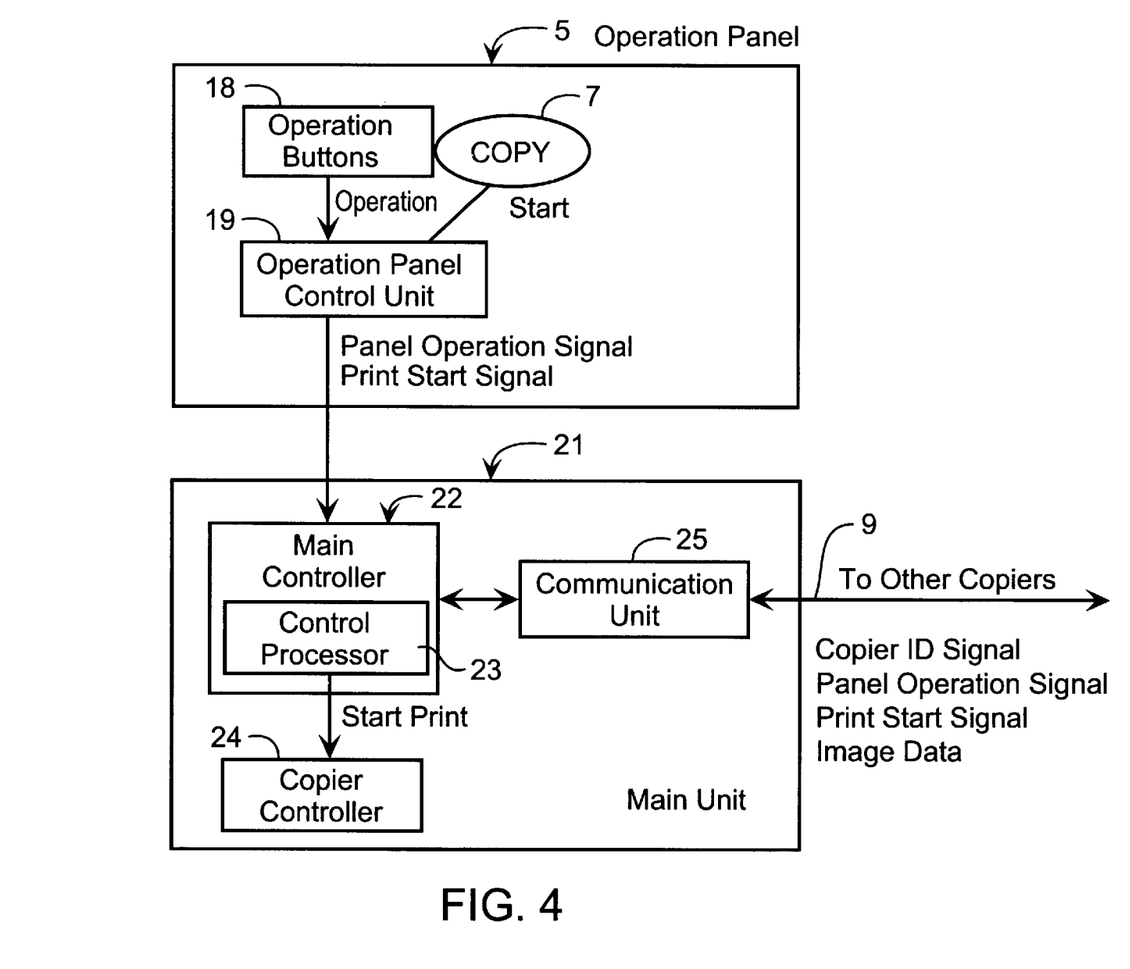
FIG. 4 is a detailed block diagram of the controller of the copier of FIG. 1.

FIG. 4 is a detailed block diagram of controllers 3 and 4 of copiers 1 and 2. Controllers 3 and 4 comprise operation panel unit 5 and main unit 21.

Operation panel unit 5 comprises the print start button 7 of FIG. 2, operation buttons 18 comprehensively representing various other buttons on the liquid crystal touch panel 11 and the like, and operation panel control unit 19 for controlling operation panel unit 5 and outputting operation panel information to main unit 21, as well as monitoring the operating states of buttons 7 and 18.

Main unit 21 comprises main controller 22 for receiving panel operation information from the operation panel controller 19, control processor 23 for controlling main unit 21 by executing predetermined control programs, copier controller 24 for controlling printing by the copier, and communications unit 25 for sending and receiving data between peer copiers via communications line 9 (refer to FIG. 1).

Control processor 23 exchanges data with other copiers connected to the image forming system via communications unit 25 and communications line 9, discriminates operation of the connected printing mode, and controls the copier controller 24 to start printing via the timing of a print start signal output from operation panel controller 19 by pressing the print start button 7. Signals and data are exchanged between copiers via the communications line 9.

Figure 5:
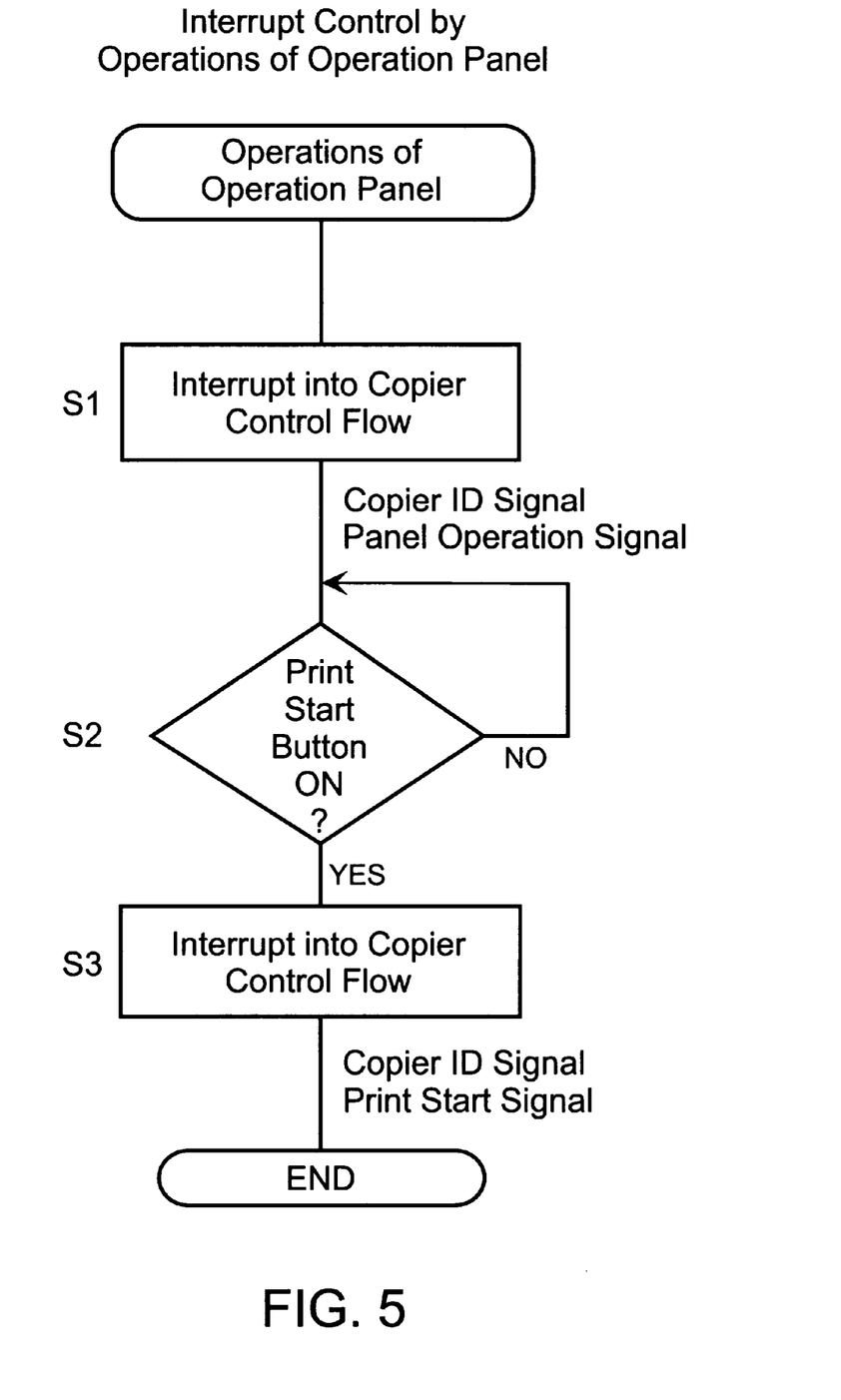
FIG. 5 is a flow chart showing the control flow of the image forming system executed by the controller of FIG. 4.
Figure 6:
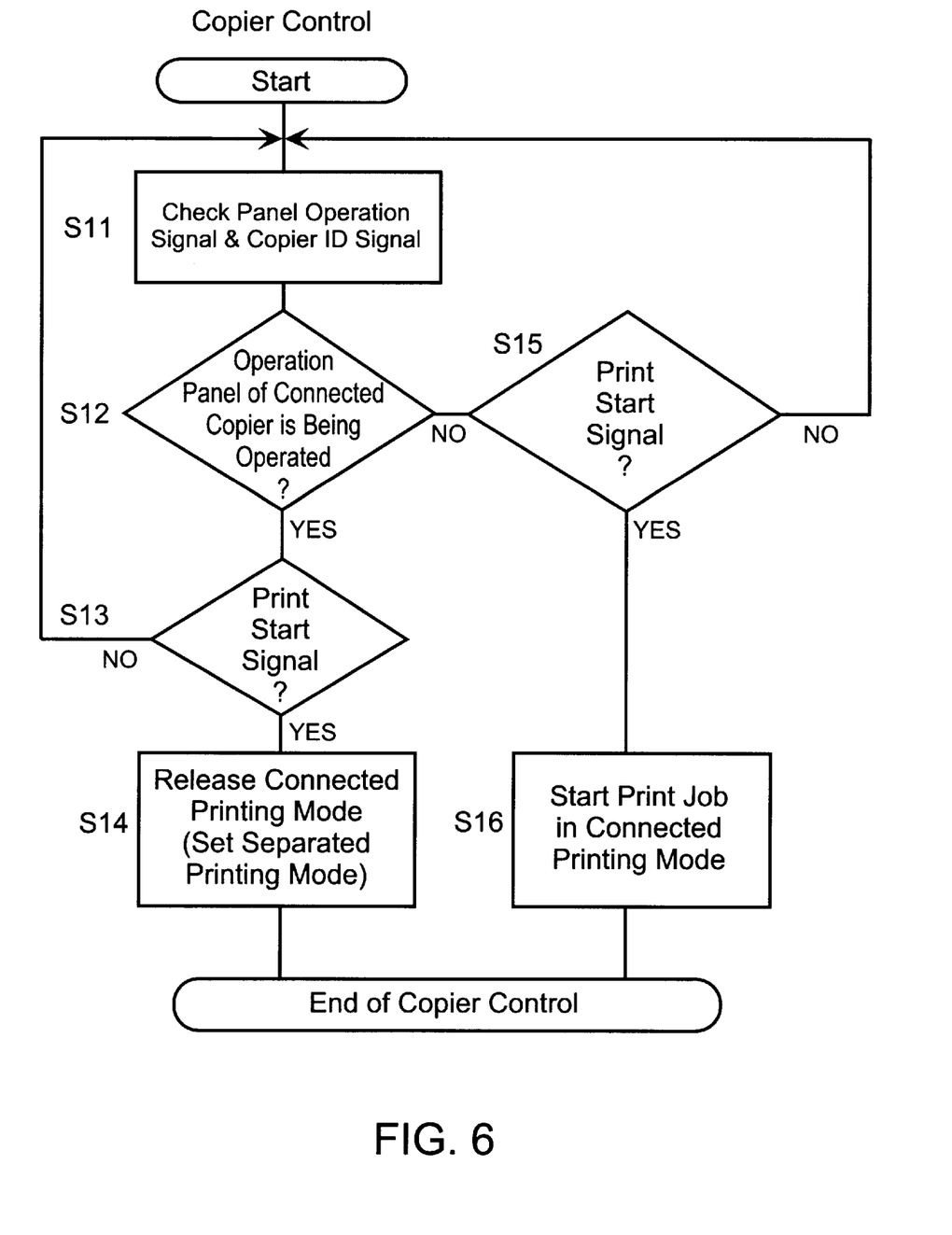
FIG. 6 is a flow chart showing the control flow of the image forming system executed by the controller of FIG. 4.

FIGS. 5 and 6 are flow charts showing the control sequence executed by the control processors of copiers 1 and 2 connected by communications line 9.

When the control processors of both copiers 1 and 2 are set at "Connected Mode 1" and an operation is executed by the copier operation panel 5 (including the print start button 7), the interrupt control shown in FIG. 5 and the copier control shown in FIG. 6 both start.

In the interrupt control of FIG. 5, when operation panel 5 is operated, in step S1 the control processor 23 generates a panel operation signal and a copier identification signal for identifying the copier, an interrupt is executed in the copier control flow of FIG. 5, and the current operation of the operation panel and the operating copier are specified on the copier control flow side. Then, in step S2, a check is made to determine whether or not the print start button 7 has been pressed. If the reply the query is NO, the standby state is active until the start button is pressed, whereas if the reply to the query is YES, the routine advances to step S3. In step S3, the panel operating signal generated in step S1 is stopped, and a print start signal and copier identification signal are generated together, an interrupt is inserted in the copier control flow, and the start of printing and copier starting printing are specified on the copier control flow side.

In the copier control shown in FIG. 6, in step S11 control processor 23 checks the copier with the operating panel connected to communication line 9 based on the panel operation signal and copier identification signal, i.e., checks the image forming system. Then, in step S12, a determination is made as to whether or not the operation panel of the connected copier is currently being operated by means of the panel operation signal. If reply to the query is YES, the routine advances to step S13, whereas if the reply to the query is NO, the routine continues to step S15. In step S13, a determination is made as to whether or not a print start signal has been generated. If the reply to the query is YES, the routine advances to step S14, the copier system connected printing mode is released, i.e., separated from connected, and controls are executed for printing by the independent copier specified by the copier identification signal, whereas if the reply to the query is NO, the routine returns to step S11.

In step S15, a determination also is made as to whether or not a print start signal has been generated. If the reply to the query is YES, printing starts as if the print start button is pressed and the routine continues to step S16, and the image forming system is set to the connected printing mode, i.e., the connected printing mode execution means is enabled and the connected operation implemented to control both copiers so as to jointly print a print job. If the reply to the query is NO, however, the routine returns to the process of step S11.

Second Embodiment

In the second embodiment of the present invention, the control sequence executed by the control processor 23 (refer to FIG. 4) acting as the controller of copiers 1 and 2 differs from that of the first embodiment. That is, when control processor 23 is executing a joint print job, i.e., printing operation, by the two connected copiers 1 and 2 under the connected printing mode and one or another copier operation panel 5 starts operating, the copier with the operating operation panel is separated from the peer copier to execute independent printing by the separated copier.

That is, when an operator, for example, operates the print start button 7 on operation panel 5 to start copying by copier 1 during the execution of a printing operation by both printers under the connected printing mode, the control processor 23 of copiers 1 and 2 determine there is currently executing connected operation by both copiers 1 and 2 via communications line 9, i.e., determines that an operator has started copying by copier 1, and automatically temporarily releases the connection. In this way the copy operation desired by the operator is executed by copier 1, and the copy operation of the currently executing connected operation is continued by copier 2 so as to receive the operator interrupt operation without stopping the currently executing printing operation under the connected printing mode, thereby providing a copier with excellent operation characteristics and greater efficiency.

Figure 7:
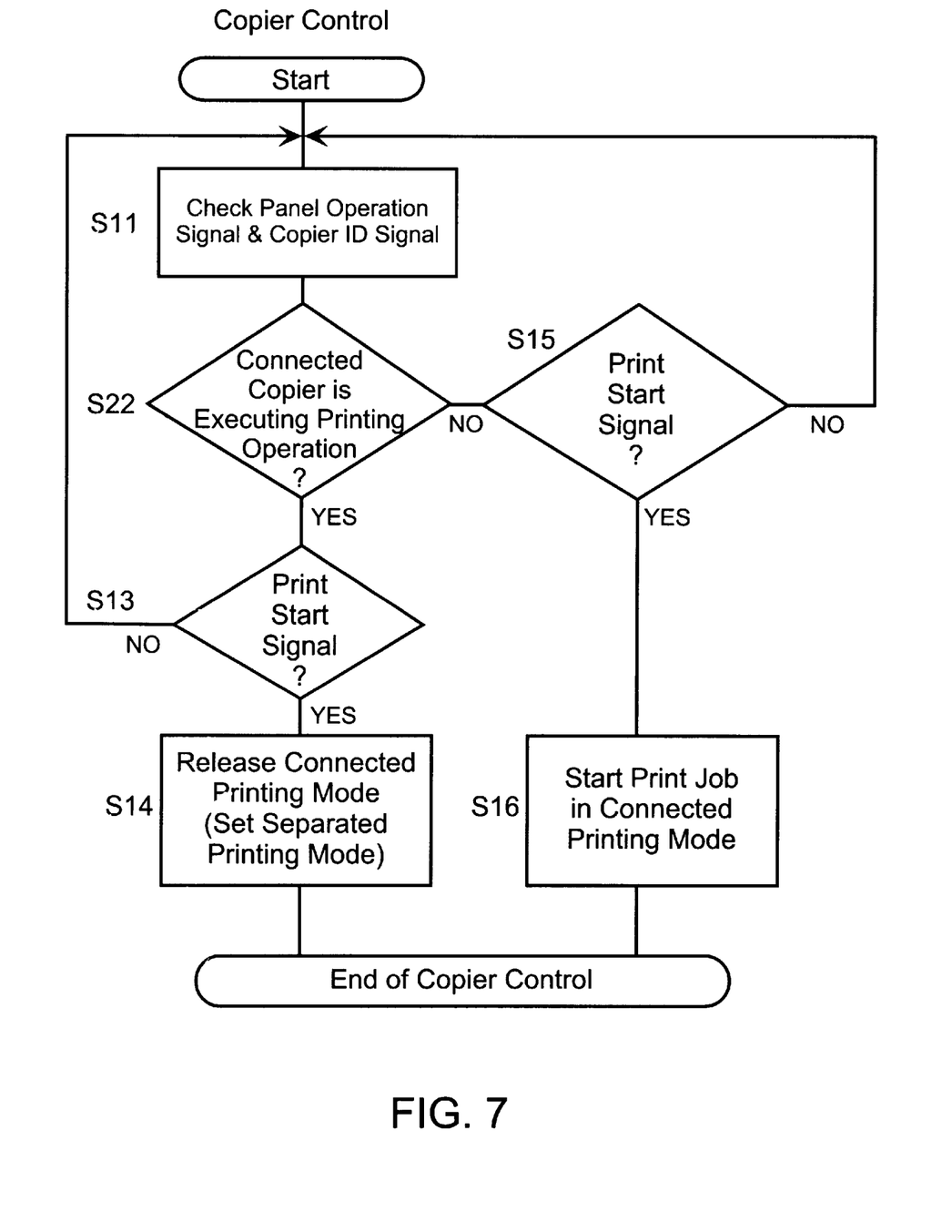
FIG. 7 is a flow chart showing the control flow executed by the controller of a second embodiment of the image forming system of the present invention.

In the second embodiment, therefore, on step S12 of the copier control flow chart of FIG. 6 is modified as shown in step S22 of FIG. 7.

In step S22 of FIG. 7, a determination is made as to whether or not a connected copier is currently executing a printing operation via the presence/absence of a print start signal. If the reply the query is YES, the routine advances to step S13, whereas if the reply the query is NO, the routine continues to step S15.

Although the first and second embodiments have been described in terms of an image forming system comprising two copiers connected by a communications line, it is to be understood that the image forming system of the present invention may be a system of three or more copiers connected by a communications line, which realizes similar effectiveness in printing with excellent efficiency. Furthermore, the image forming apparatus of the present invention is not limited to the copiers described in the aforesaid embodiments, and may be applied facsimile machines and printers.

As previously described, the first embodiment of the present invention pertains to an image forming system connecting a plurality of image forming apparatuses via a communications line and having communications functions, said image forming system comprising a connected printing mode setting means for setting a connected printing mode to allocate print jobs to be printed to a plurality of said image forming apparatuses, a connected printing mode execution means to execute printing in the connected printing mode by said plurality of image forming apparatuses, and an inhibiting means for inhibiting the use of a second image forming apparatus under the connected printing mode when said second image forming apparatus has received a print command simultaneously with the setting or during the setting of a connected printing mode in a first image forming apparatus to use said second image forming apparatus in joint printing, such that when one user has set a specific image forming apparatus in the connected printing mode, another user may enter a print command in another image forming apparatus so as to immediately execute the desired printing by said other image forming apparatus itself without the necessity of waiting for the completion of the first job being printed under the connected printing mode as in the conventional art, thereby allowing printing with excellent operation characteristics and greater efficiency.

The second embodiment of the present invention pertains to an image forming system comprising a connected printing mode setting means for setting a connected printing mode to allocate print jobs to be printed to a plurality of image forming apparatuses, a connected printing mode execution means to execute printing in the connected printing mode by said plurality of image forming apparatuses, and a release means for releasing the use of a specific image forming apparatus under the connected printing mode when said specific image forming apparatus receives a print command while a printing operation is being executed by a plurality of image forming apparatuses under the connected printing mode, such that when a print job is being executed under the connected printing mode and a specific user enters a print command in a specific image forming apparatus, the desired printing can be immediately executed by said specific image forming apparatus itself without the necessity of waiting for the completion of the first job being printed under the connected printing mode as in the conventional art, thereby allowing printing with excellent operation characteristics and greater efficiency.

It is also possible that one embodiment could include both the inhibiting means of the first embodiment and the releasing means of the second embodiment.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An image forming system including a plurality of image forming apparatuses connected via a communications line and having a communications function, each of said image forming apparatuses comprising:

a mode setting unit which sets a connected printing mode to allocate print jobs to be printed to the plurality of image forming apparatuses;

a printing controller which executes printing by one of the plurality of image forming apparatuses in conjunction with another one of said plurality of image forming apparatuses in the connected printing mode; and an inhibiting controller which inhibits the use of said another one of said plurality of image forming apparatuses under the connected printing mode when a print command is issued in said one of the plurality of image forming apparatuses while an operation is being executed in the another one of said plurality of image forming apparatuses.

2. The image forming system of claim 1, wherein the operation is a printing operation.

3. The image forming system of claim 1, wherein the operation is a control panel operation.

4. An image forming system for controlling a plurality of image forming apparatuses connected via communication lines, said image forming system comprising:

a mode setting unit which sets a connected printing mode to allocate print jobs to be printed to the plurality of image forming apparatuses;

a controller which causes one of said plurality of image forming apparatuses to execute printing in the connected printing mode in conjunction with another one of said plurality of image forming apparatuses when a print command is issued while an operation is not executed in said another one of said plurality of image forming apparatuses, and causes the one of said plurality of image forming apparatuses to execute printing with releasing the use of the another one of said plurality of image forming apparatuses under the connected printing mode when a print command is issued to the another one of the plurality of image forming apparatuses while the operation is being executed in the another one of said plurality of image forming apparatuses.

5. The image forming system of claim 4, wherein the operation is a printing operation.

6. The image forming system of claim 4, wherein the operation is a control panel operation.

7. An image forming apparatus, comprising:

a communications line for connecting the image forming apparatus to other image forming apparatuses to create a system of a plurality of image forming apparatuses;

a mode setting unit for setting a connecting printing mode to allocate print jobs to be printed by the plurality of image forming apparatuses;

a print control unit for executing printing in the connected printing mode by the plurality of image forming apparatuses; and a releasing control unit for releasing the use of one of the other image forming apparatuses under the connected printing mode when the image forming apparatus receives a print command while an operation is being executed in the one of the other image forming apparatuses in the connected printing mode.

8. The image forming apparatus of claim 7, wherein the operation is a printing operation.

9. The image forming apparatus of claim 7, wherein the operation is a control panel operation.

10. An image forming apparatus, comprising:

a communications line for connecting the image forming apparatus to other image forming apparatuses to create a system of a plurality of image forming apparatuses;

a mode setting unit for setting a connected printing mode to allocate print jobs to be printed by the plurality of image forming apparatuses; and a controller for executing printing in the connected printing mode in conjunction with another of the plurality of image forming apparatuses when the image forming apparatus has received a print command during a non-operation period of the another of the plurality of image forming apparatuses, and executing printing with inhibiting the use of the another of the image forming apparatuses in the connected printing mode when the image forming apparatus has received a print command during an operation period of the another of the image forming apparatuses.

11. The image forming apparatus of claim 10, wherein said operation period is a period during which the another of the image forming apparatuses is executing a print job.

12. The image forming apparatus of claim 10, wherein said operation period is a period during which an operation panel the another of the image forming apparatuses is being operated.

13. An image forming system including a plurality of image forming apparatuses connected via a communications line and having a communications function, each of said plurality of image forming apparatuses comprising:

a connected printing mode setting means for setting a connected printing mode to allocate print jobs to be printed to the plurality of image forming apparatuses;

a connected printing mode execution means for executing printing in the connected printing mode by said plurality of image forming apparatuses; and an inhibiting means for inhibiting the use of a second one of the plurality of image forming apparatuses under the connected printing mode when a print command is issued to a first one of the plurality of the image forming apparatuses while a printing operation is being executed by the second one of the plurality of image forming apparatuses.

14. A control method for controlling an image forming operation of a system which includes a plurality of image forming apparatuses connected via a communications line, said control method comprising the steps of:

issuing a print start signal from a specific one of the plurality of image forming apparatuses;

judging whether an operation is being executed by another one of the plurality of image forming apparatuses or not when the print start signal is issued in said issuing step; executing a print job by both of said specific one of the plurality of image forming apparatuses and said another one of said plurality of image forming apparatuses in a case that a result of said judging step is negative; and executing a print job by only said specific one of said plurality of image forming apparatuses in a case that a result of said judging step is positive.

15. The control method of claim 14, wherein the operation is a printing operation.

16. The control method of claim 14, wherein the operation is related to a control panel.

* * * * *